J. ELKAN.
UNIVERSAL JOINT.
APPLICATION FILED MAR. 12, 1908.
912,096.
Patented Feb. 9, 1909.
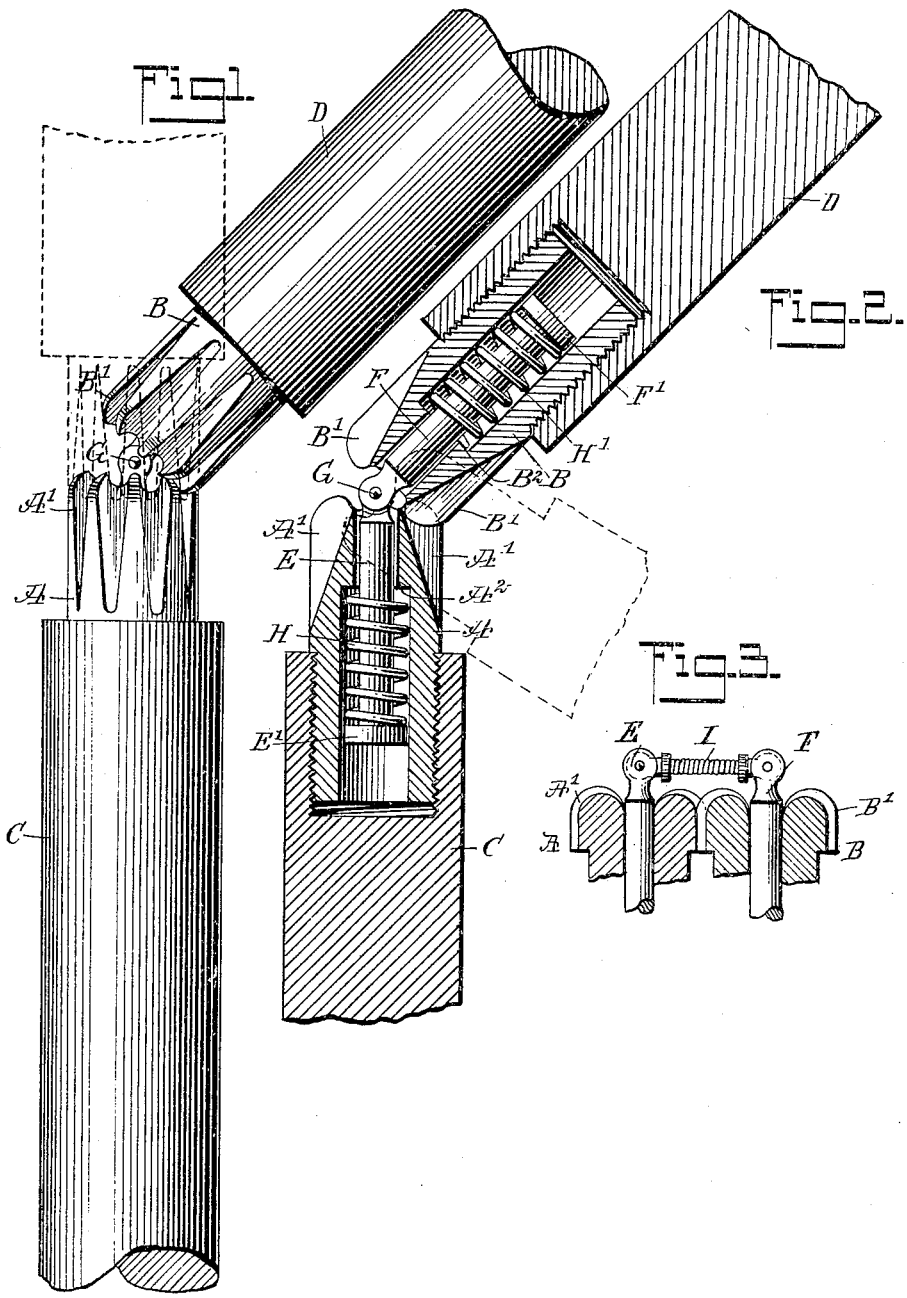
WITNESSES
INVENTOR
Jacob Elkan
BY
ATTORNEYS

UNITED STATES PATENT OFFICE.

JACOB ELKAN, OF NEW YORK, N. Y.

UNIVERSAL JOINT.

No. 912,096.  Specification of Letters Patent.  Patented Feb. 9, 1909.

Application filed March 12, 1908. Serial No. 420,710.

*To all whom it may concern:*

Be it known that I, JACOB ELKAN, a subject of the Czar of Russia, and a resident of the city of New York, borough of Manhattan, in the county and State of New York, have invented a new and Improved Universal Joint, of which the following is a full, clear, and exact description.

The invention relates to the transmission of power, and its object is to provide a new and improved universal joint, which is simple and durable in construction and arranged to permit of running shafts at any desired angle one to the other, and of changing the angle to suit existing conditions.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a sectional side elevation of the same; and Fig. 3 is a side elevation of a modified form of the improvement.

The gear members A and B of the universal joint are in mesh with each other and are attached to or formed on the adjacent ends of the shafts C and D, and the said gear members A and B have their teeth A', B' extending on the ends and sides of the members, so that the gear members are in mesh with each other whether the members are in or out of axial alinement, as will be readily understood by reference to the drawings.

In the gear members A and B are mounted to turn and to slide axially the links E and F, pivotally connected with each other at their outer ends by a pivot G, the inner ends of the links E and F being provided with collars E', F' (see Fig. 2) on which press springs H, H' coiled on the inner ends of the links E and F, the springs resting against shoulders A², B² formed in the gear members A and B, as shown in Fig. 2.

By the arrangement described, the gear members A and B are pressed toward each other to hold the members in mesh, and the links E and F are free to yield and to slide axially in the gear members A and B whenever the latter are moved into a more or less inclined position one relative to the other. The rotary motion given to one of the shafts C or D is positively transmitted to the other shaft D or C by the meshing gear members A and B, the links E, F remaining at a standstill.

In case the shafts C and D stand in a parallel or an approximately parallel position, as shown in Fig. 3, then the outer ends of the links E and F are preferably connected with each other by a cable or other flexible connecting link I, to allow the links E and F to assume a parallel position and to prevent undue strain of the springs H, H', and thus insure easy running of the gear members A and B.

It is understood that when the gear members A and B are in axial alinement, then the gear teeth A', B' are all in mesh with each other, that is, the gear teeth A', B' form a coupling to positively couple the gear members A and B with each other, to rotate one shaft from the other.

The universal joint shown and described is very simple and durable in construction, and composed of comparatively few parts, not liable easily to get out of order.

Having thus described my invention, I claim as new and desire to secure by Letters Patent:

1. A universal joint, comprising gear members having teeth on their ends and sides and in mesh with each other, links mounted to slide freely in the said gear members, springs within the said gear members and pressing the said links inwardly, and means pivotally connecting the said links with each other.

2. A universal joint, comprising gear members having teeth on their ends and sides and in mesh with each other, links mounted to slide freely in the said gear members, springs within the said gear members and pressing the said links inwardly, and a pivot pin connecting the outer ends of the said links with each other.

3. A universal joint, comprising gear members in mesh with each other, each member having a bore in two diameters, a link in the bore of each gear member and having a collar at its inner end, a spring surrounding each link between the collar thereof and the shoulder at the junction of the two bores, and a pivotal connection between the outer ends of the links.

In testimony whereof I have signed my name to this specification in the presence of two subscribing witnesses.

JACOB ELKAN.

Witnesses:
 THEO. G. HOSTER,
 EVERARD B. MARSHALL.